(12) United States Patent
Huynh

(10) Patent No.: US 9,964,038 B2
(45) Date of Patent: May 8, 2018

(54) SUPERSONIC CARET INLET SYSTEM LEADING EDGE SLAT FOR IMPROVED INLET PERFORMANCE AT OFF-DESIGN FLIGHT CONDITIONS

(71) Applicant: The Boeing Company, Chicago, IL (US)

(72) Inventor: Thuy Huynh, Ofallon, MO (US)

(73) Assignee: The Boeing Company, Chicago, IL (US)

( * ) Notice: Subject to any disclaimer, the term of this patent is extended or adjusted under 35 U.S.C. 154(b) by 778 days.

(21) Appl. No.: 14/659,148

(22) Filed: Mar. 16, 2015

(65) Prior Publication Data

US 2016/0376987 A1  Dec. 29, 2016

(51) Int. Cl.
*F02C 1/00* (2006.01)
*F02C 7/042* (2006.01)
*B64D 33/02* (2006.01)
*F02C 7/045* (2006.01)

(52) U.S. Cl.
CPC .............. *F02C 7/042* (2013.01); *B64D 33/02* (2013.01); *F02C 7/045* (2013.01); *B64D 2033/026* (2013.01); *B64D 2033/0206* (2013.01); *B64D 2033/0273* (2013.01); *F05D 2220/80* (2013.01)

(58) Field of Classification Search
CPC .... F02C 7/042; F02C 7/057; B64D 2033/026; B64D 2033/0273; B64D 2033/0286; F05D 2220/80; Y10T 137/0536; Y10T 137/0645

See application file for complete search history.

(56) References Cited

U.S. PATENT DOCUMENTS

| | | | |
|---|---|---|---|
| 4,620,679 A | | 11/1986 | Karanian |
| 5,586,735 A | * | 12/1996 | Falempin ............... B64D 33/02 137/15.1 |
| 2007/0181743 A1 | * | 8/2007 | Klinge ................... B64C 21/10 244/62 |
| 2008/0223978 A1 | * | 9/2008 | Kechely ................. F02C 7/042 244/10 |

FOREIGN PATENT DOCUMENTS

| | | |
|---|---|---|
| EP | 0354103 A1 | 2/1990 |
| EP | 0646525 A1 | 4/1995 |
| EP | 2703624 A1 | 3/2014 |
| FR | 1234483 A | 10/1960 |

* cited by examiner

*Primary Examiner* — Pascal M Bui Pho
*Assistant Examiner* — Edwin Kang
(74) *Attorney, Agent, or Firm* — Felix L. Fischer

(57) ABSTRACT

An engine inlet for efficient operation at both design Mach number and off-design Mach numbers with an inlet having a caret configuration with rotatably extending effective leading edges on the inlet from a retracted position aligned with a nominal Mach number shock wave to an extended position aligned with an off-design Mach number shock wave.

15 Claims, 14 Drawing Sheets

SUPERSONIC CARET INLET SYSTEM LEADING EDGE SLAT FOR IMPROVED INLET PERFORMANCE AT OFF-DESIGN FLIGHT CONDITIONS

BACKGROUND INFORMATION

Field

Embodiments of the disclosure relate generally to supersonic inlets for aircraft jet engines and more particularly to a caret inlet having variable geometry for off-design flight conditions.

Background

Engine inlets for supersonic aircraft have complex aerodynamic requirements based on Mach number and other flight conditions. Fixed inlet geometries typically have highest efficiency at one specific Mach number and flight condition. Operation at other speeds or flight conditions results in degradation of the aerodynamic performance or efficiency of the inlet. To allow flight at varying Mach number, mechanical systems to adjust the capture area and ramp geometry of the inlet may be employed to increase efficiency. An existing solution to a variable ramps and variable capture inlet is the F-15 Eagle produced by The Boeing Company. This inlet system is highly efficient and is recognized as an optimized inlet design. However, later-generation fighters require unique inlet shaping where the inlet aperture edges are highly swept. In such aircraft a caret-type inlet system is employed. Examples of aircraft employing such inlets are the F-18E/F Super Hornet produced by The Boeing Company and the F-22 Raptor produced by Lockheed Martin. These inlets are fixed geometry inlets and were designed for optimized operation at a particular flight Mach number. At off-design Mach numbers in a fixed-geometry inlet system the shockwave may detach from the ramp leading edge of the caret because the inlet is no longer on-design. In addition, the flow field inside the inlet aperture is 3-dimensional and the shock wave is 3-dimensional as well. The combination of these can decrease inlet total pressure recovery and increase inlet distortion.

It is therefore desirable to provide an inlet which will help improve inlet performance at off-design Mach numbers by maintaining an attached 2-D shock wave and 2-D flow field inside the inlet aperture.

SUMMARY

Exemplary embodiments provide an engine inlet for efficient operation at both design Mach number and off-design Mach numbers with an inlet having a caret configuration by rotatably extending effective leading edges on the inlet from a retracted position aligned with a nominal Mach number shock wave to an extended position aligned with an off-design Mach number shock wave.

The embodiments provide a method for increasing inlet pressure recovery and reducing inlet distortion by maintaining an attached shock wave for a caret inlet across a range of velocities by providing an external compression caret inlet; and angularly extending the effective leading edge of the inlet at off-design Mach numbers.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

DETAILED DESCRIPTION

The system and methods described herein provide embodiments for a caret inlet aperture (rhombus shaped leading edges) that is derived from a single virtual wedge/ramp. The inlet features an extendible leading edge provided by leading edge slats which are deployed at off-design Mach numbers to help the inlet system maintain an attached shock wave as well as maintaining a 2-Dimensional flowfield inside the inlet aperture. This combination assists in increasing inlet pressure recovery and reducing inlet distortion.

Figure 1A:
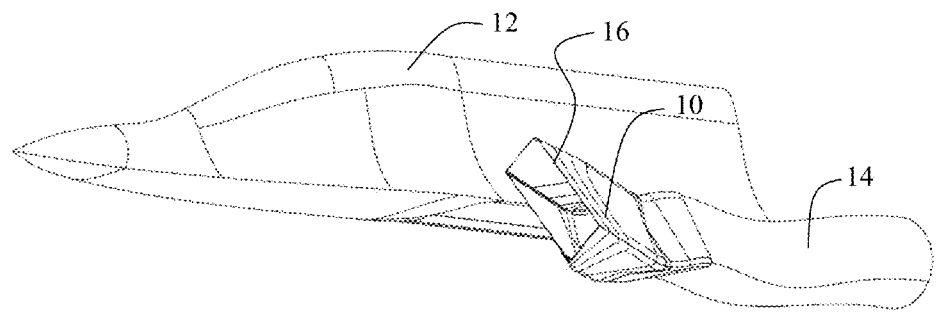
FIG. 1A is a perspective view of a fuselage portion and associated caret inlet with a representative diffuser section of a representative aircraft.
Figure 1B:
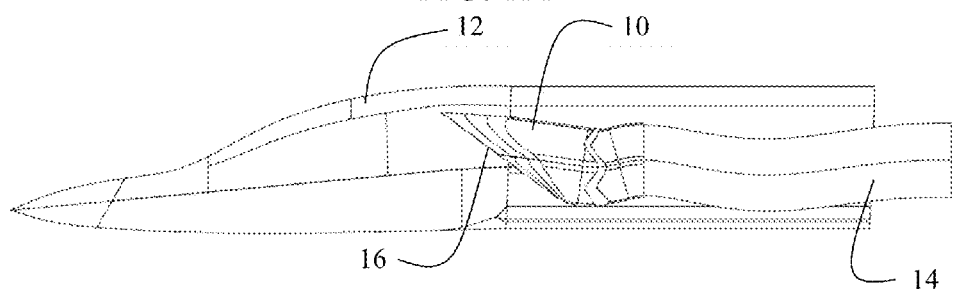
FIG. 1B is a side view of the aircraft of FIG. 1A.
Figure 1C:
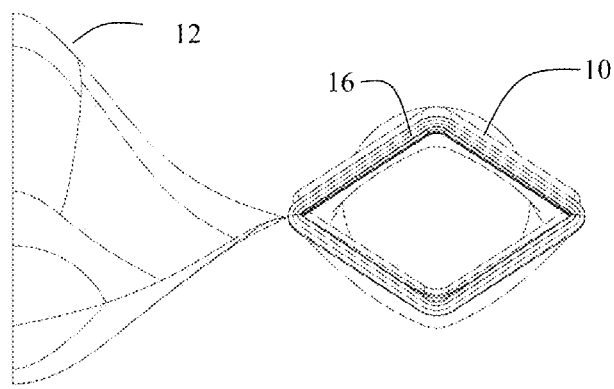
FIG. 1C is a front view of the aircraft of FIG. 1A.
Figure 2A:
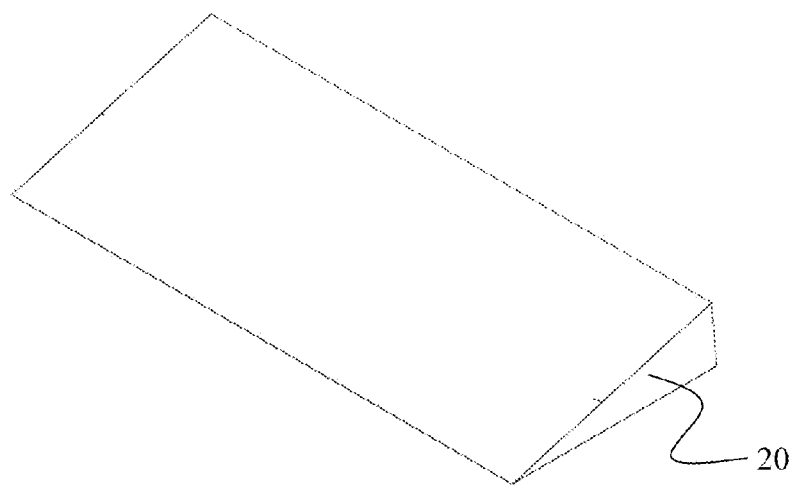
FIG. 2A is a pictorial representation of a virtual wedge simulating an inlet angle for a representative caret inlet at supersonic speed.
Figure 2B:
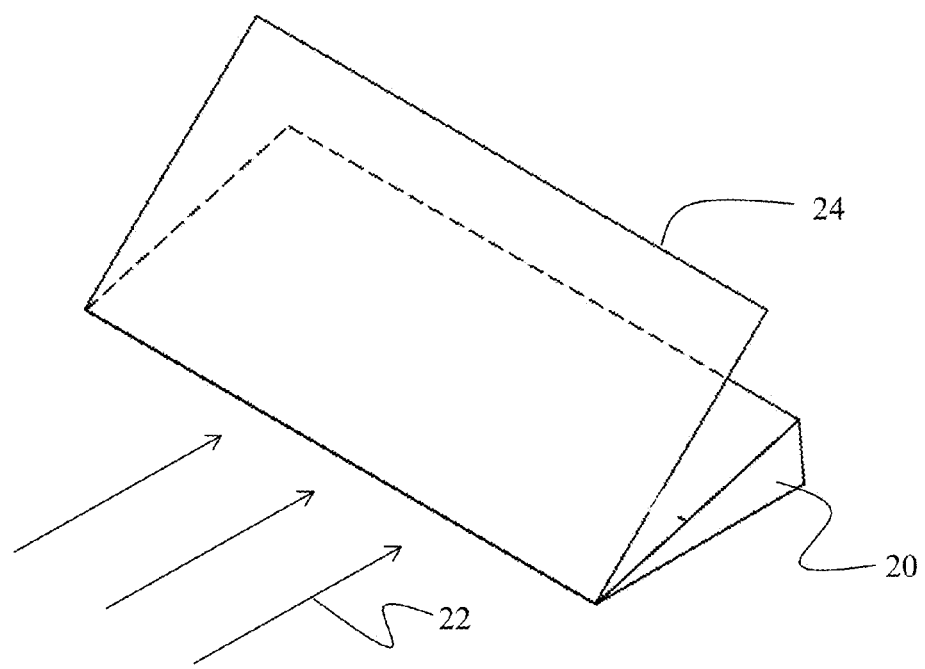
FIG. 2B is a pictorial representation of the shock wave created by the virtual wedge.
Figure 2C:
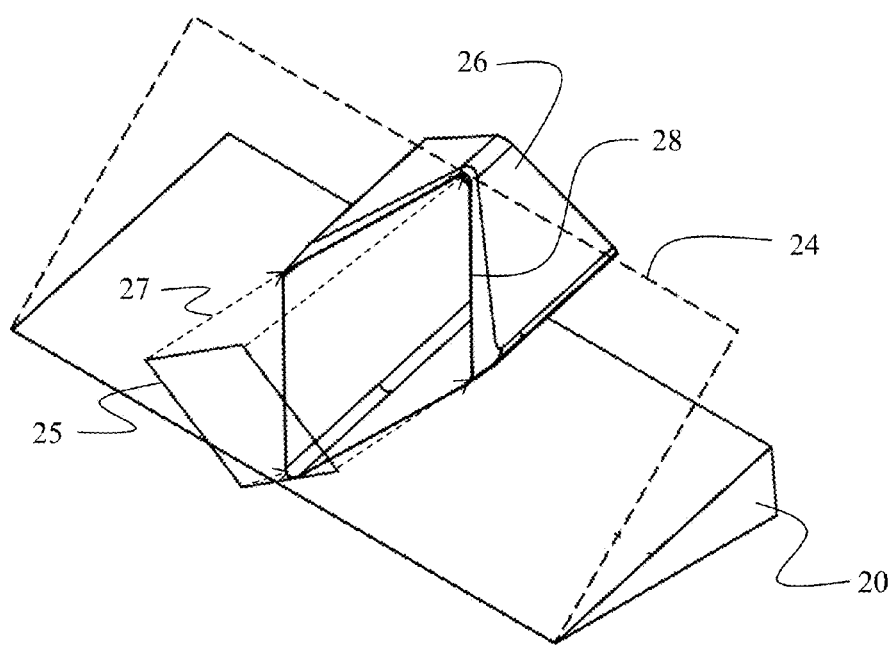
FIG. 2C is a pictorial representation of an inlet duct with a streamline trace of a projected edge on the shock wave.
Figure 2D:
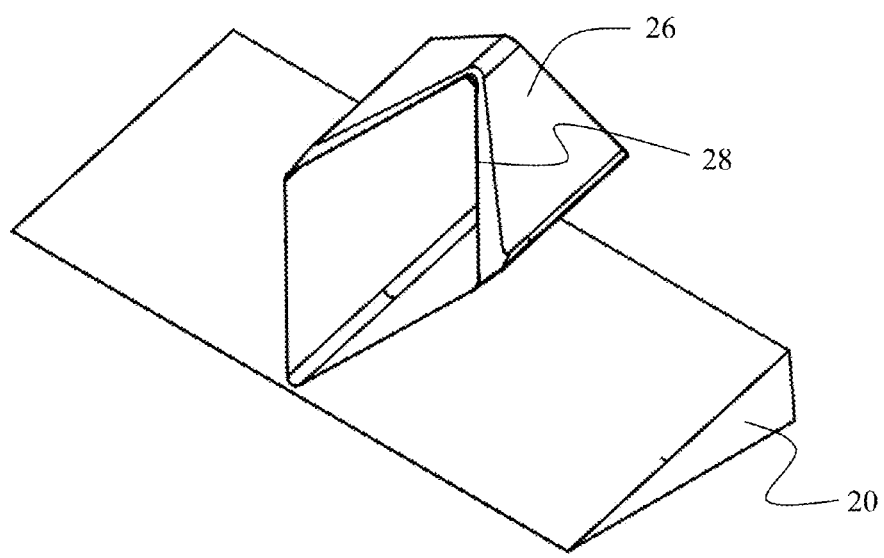
FIG. 2D is a pictorial representation of the inlet duct with an aperture formed by the resulting projected edge.

Referring to the drawings, FIGS. 1A-1C show representative portions of an exemplary aircraft employing the embodiments of a caret inlet as disclosed herein. A caret inlet 10 is mounted adjacent a fuselage 12. A diffuser 14 extends from the caret inlet to a jet engine (not shown). The ramp leading edges 16 of the caret inlet 10 are highly swept. The shape of the ramp leading edges and sweep angle are defined based on a virtual wedge established for a nominal design Mach number, as will be described in greater detail subsequently. An example of a virtual wedge 20 is shown in FIG. 2A (the images of FIGS. 2A-2E are shown in an inverted perspective for clarity). Supersonic flow represented by arrows 22 striking the virtual wedge 20 will result in a virtual shock wave 24 as shown in FIG. 2B. For a given inlet profile 25 for an inlet duct 26, a streamline trace (represented by arrows 27) from the inlet profile of a projected edge 28 on the virtual shock wave 24 provides a definition for the caret inlet as shown in FIG. 2C. With the shock wave removed for clarity, the resulting inlet duct 26 is seen in FIG. 2D.

Figure 2E:
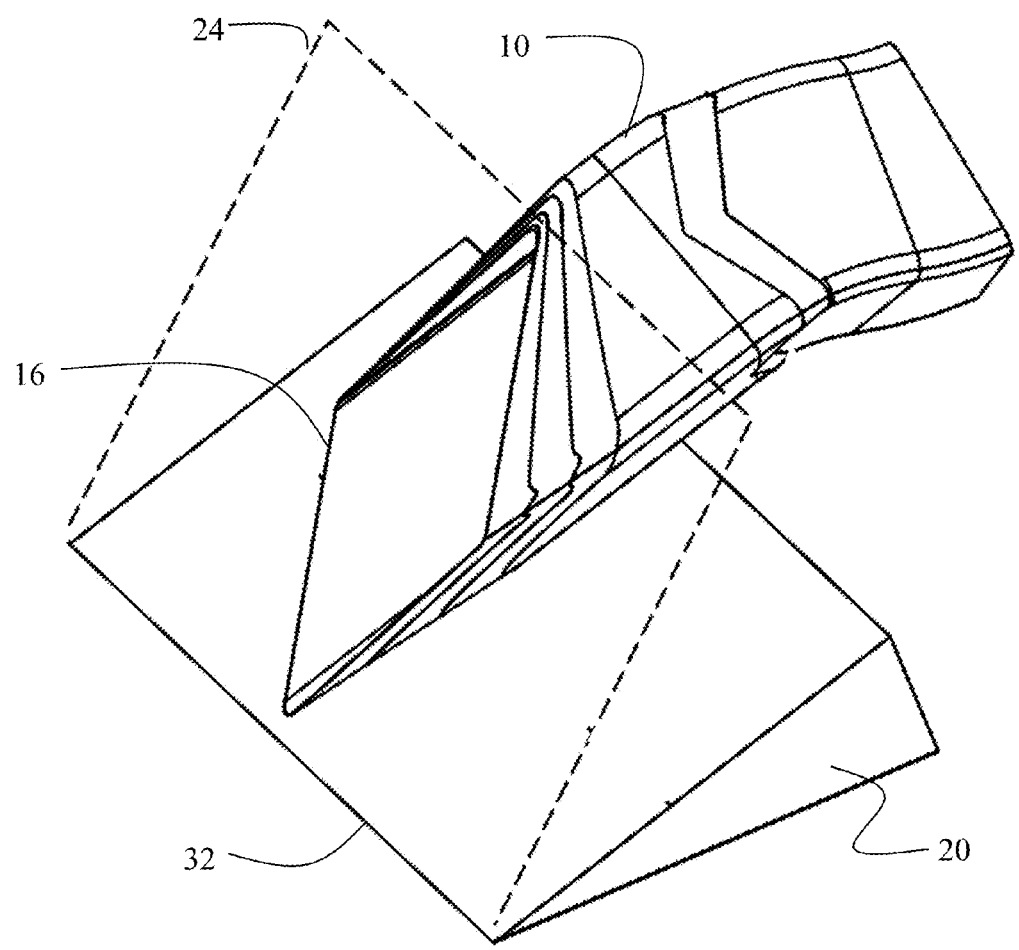
FIG. 2E is a pictorial representation of an implemented caret inlet and diffuser section employing the inlet duct of FIG. 2D.

As shown in FIG. 2E, a complete caret inlet 10 may then be implemented with ramp leading edges 16 based on the projected edge 28 (seen in FIG. 2D) for the inlet duct 26 with an inlet angle commensurate with the virtual wedge 20 and the associated shock wave 24 created at edge 32.

Figure 2F:
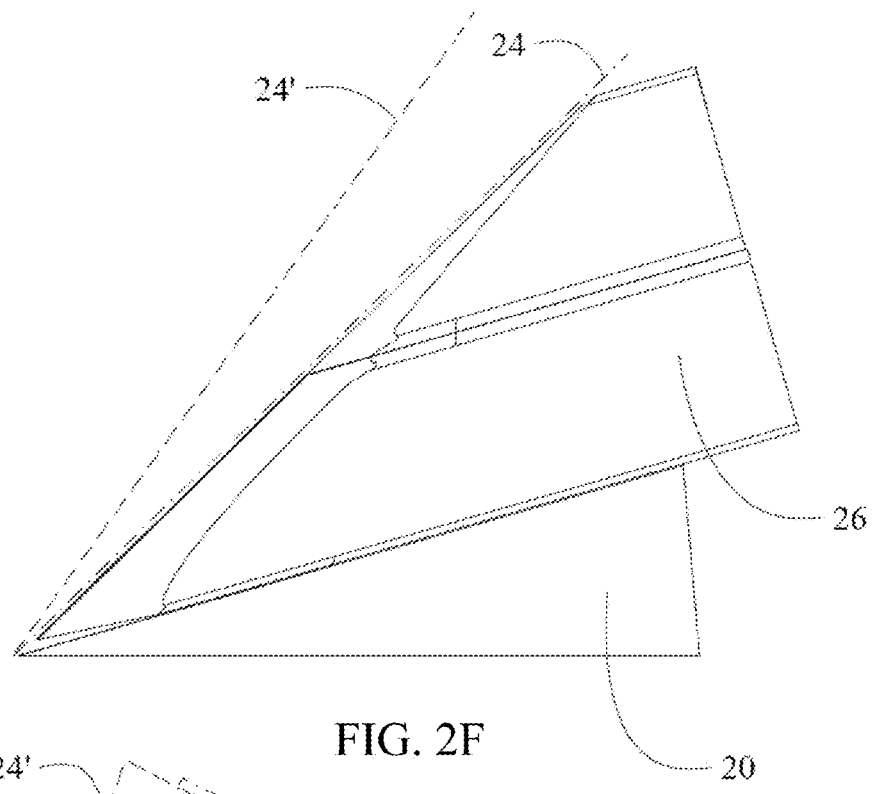
FIG. 2F is a side view of the inlet duct with a shock wave created by the virtual wedge at an off-design Mach number.
Figure 2G:
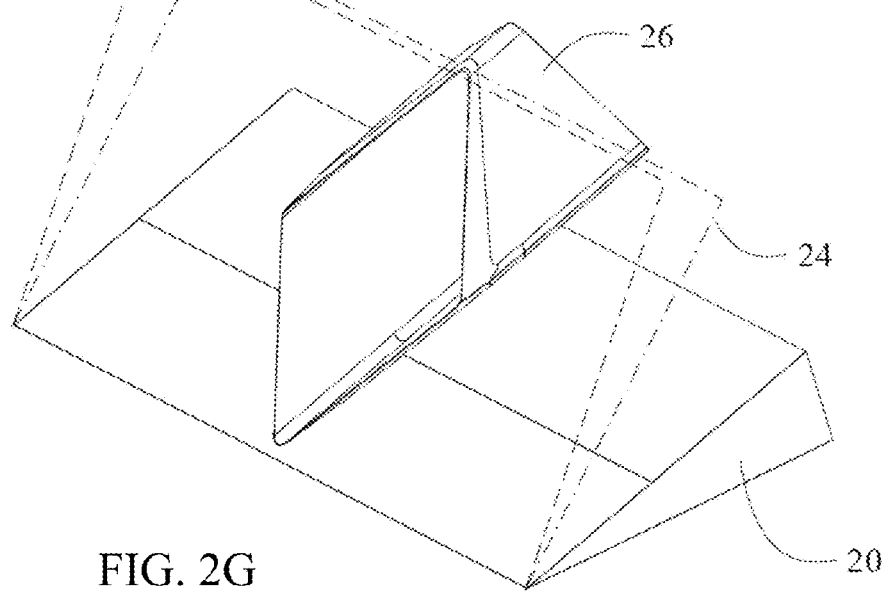
FIG. 2G is a pictorial representation of the inlet duct with a shock wave created by the virtual wedge at the off-design Mach number of FIG. 2F.
Figure 3:
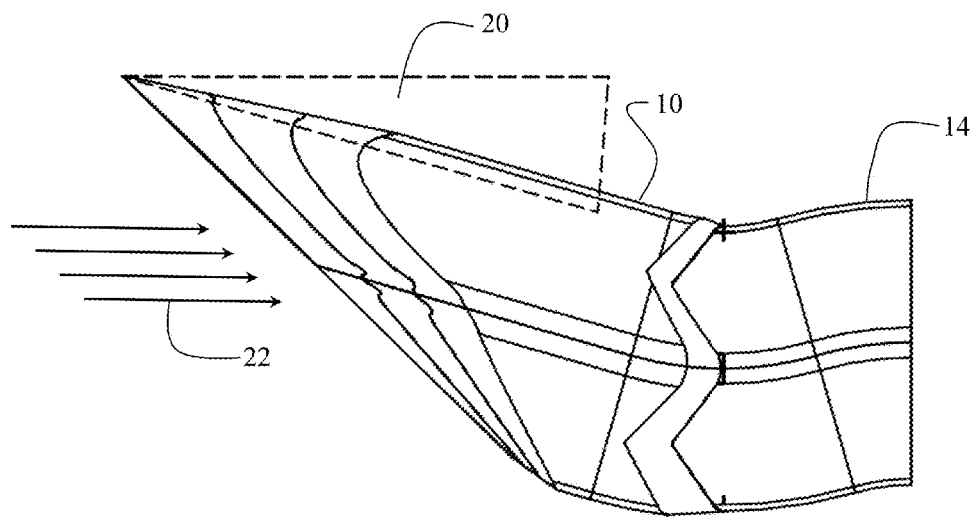
FIG. 3 is a side view of a caret inlet in which the embodiments described herein may be employed with the representative virtual wedge superimposed on the image.
Figure 4:
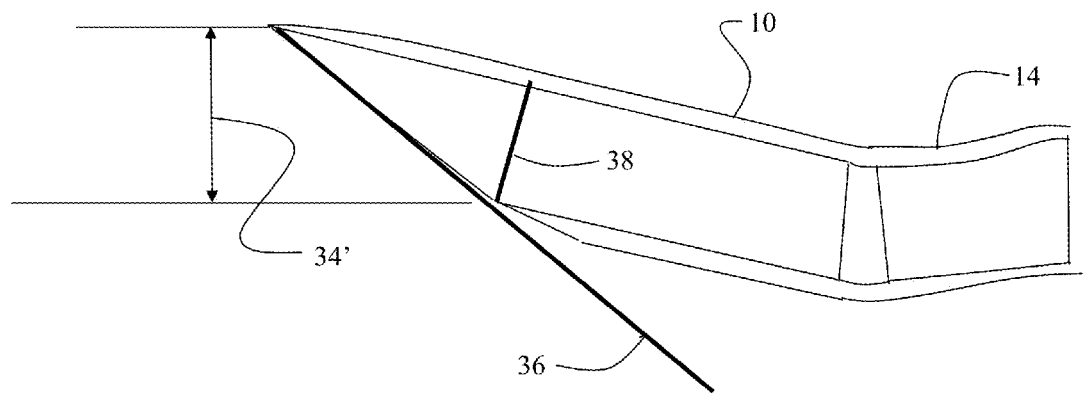
FIG. 4 is a side section view of the caret inlet operating at the design Mach number with the representative virtual wedge superimposed on the image and showing the shock waves generated.

The complete caret inlet 10 is shown in FIG. 3. The caret inlet 10 presents a design point capture area to the free stream flow represented by arrows 22 with a vertical dimension 34 which accommodates the necessary airflow at the design point Mach number. As shown in FIG. 4, an oblique shock wave 36 is formed at the inlet entrance and a normal shock wave 38 is formed in the inlet, the oblique shock wave substantially commensurate with the virtual shock wave based on the virtual wedge 20 employed in the design as described with respect to FIGS. 2A-2E. However, at off-design Mach conditions, a shock wave 24' created by the virtual wedge 20 is altered in angle from the design point shock wave 24 as shown in FIGS. 2F and 2G (also shown inverted for clarity).

Figure 5A:
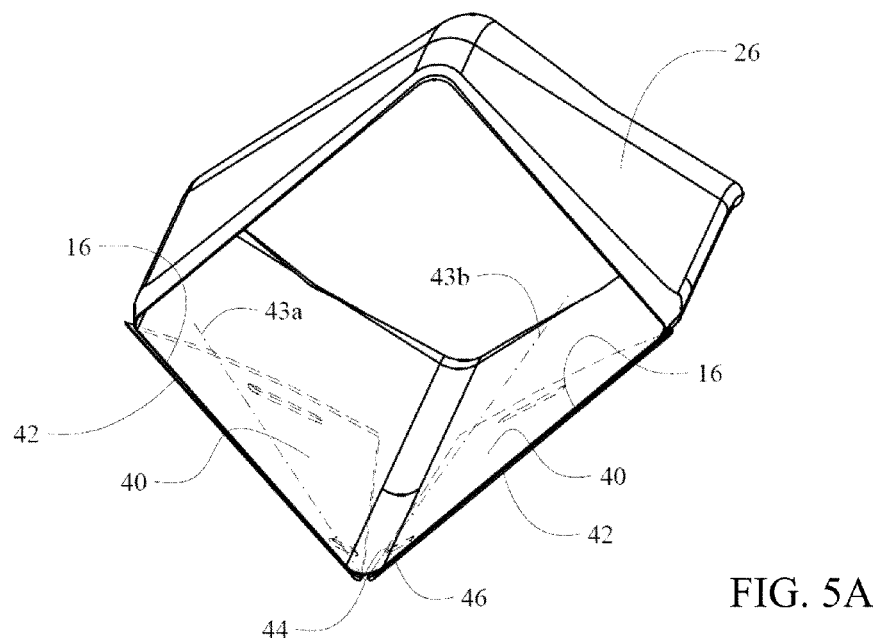
FIG. 5A is a pictorial representation of a simplified caret inlet employing slats in accordance with the described embodiments in a closed position shown inverted for clarity.
Figure 5B:
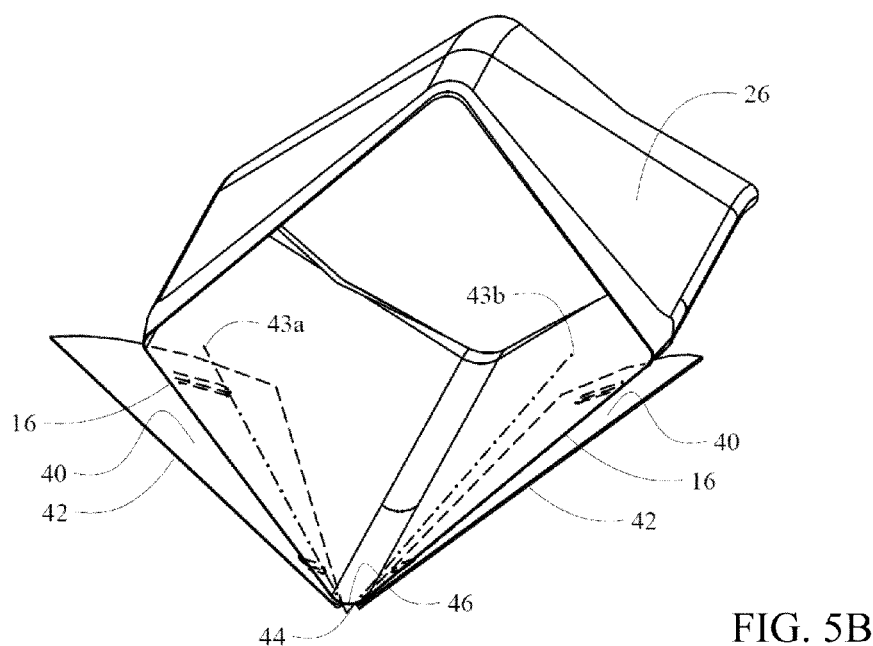
FIG. 5B is a pictorial representation of the caret inlet of FIG. 4A with the slats in a deployed position.

The present embodiments provide adjustable slats 40 for the caret inlet which allow extending the effective leading edge of the inlet to accommodate supersonic speeds differing from the nominal design Mach number as shown in FIGS. 5A and 5B (shown inverted for clarity). As seen in FIG. 5A, with the slats 40 in a retracted position a leading edge 42 of each slat is aligned with the ramp leading edge 16 of the inlet. For extension, the slats 40 pivot about axes 43a and 43b, respectively, extending through a leading vertex 44 which is located adjacent to and substantially coincident with an intersection 46 of the ramp leading edges 16. When extended, as shown in FIG. 5B, the slat leading edge 42 provides an angular extension of the effective leading edge from the ramp leading edge 16.

Figure 6A:
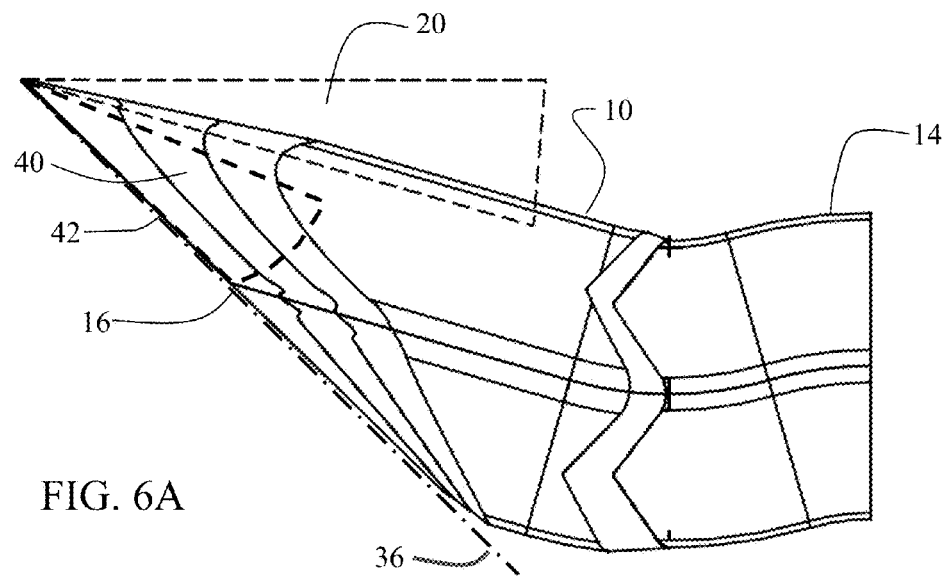
FIG. 6A is a side view of a caret inlet operating at design Mach with the virtual wedge superimposed and showing a representative shock wave.
Figure 6B:
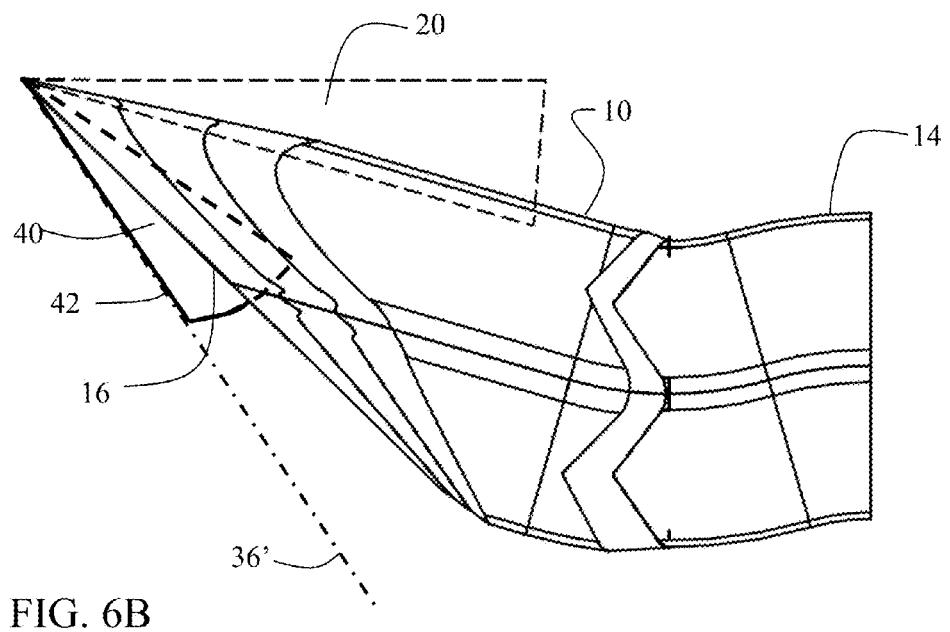
FIG. 6B is a side view of the caret inlet of FIG. 5A operating at an off-design Mach with the virtual wedge superimposed and showing a representative shock with the slats extended with the leading edges at the shock angle.
Figure 6C:
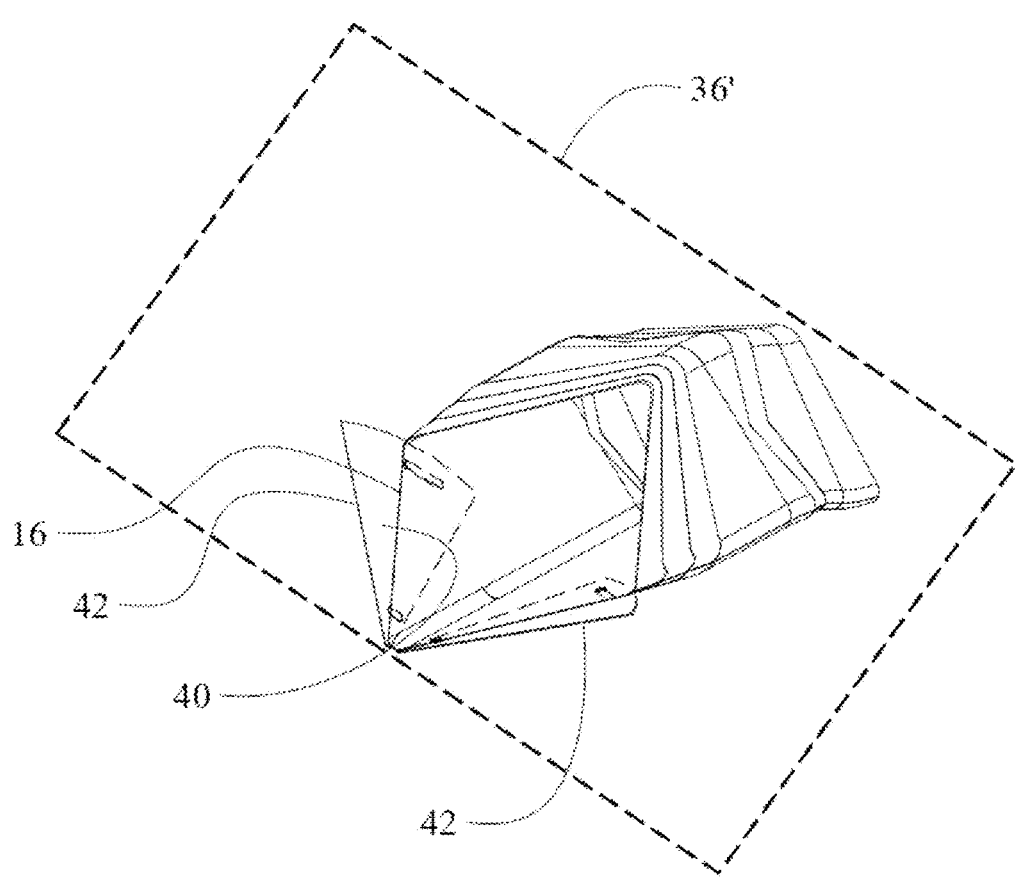
FIG. 6C is a pictorial representation of the caret inlet of FIG. 5B inverted for clarity and showing the representative shock wave with the slats extended with the leading edges at the shock angle

A seen in FIG. 6A, with the slats 40 in the retracted position, the angle of the ramp leading edge 16 and slat leading edge 42 match the angle of the oblique shock 36 created by the inlet at the design Mach number. At an off-design Mach number as shown in FIGS. 6B and 6C, the resulting oblique shock wave 36' (corresponding to the virtual shock wave 24' resulting from the virtual wedge 20 as described in FIGS. 2F and 2G) has an angle which no longer matches the angle of the ramp leading edge 16. FIG. 6C is also shown inverted for clarity. However, the slat 40 extended by rotating about the axis through its vertex 44 provides alignment of the slat leading edge 42, which becomes the effective aerodynamic leading edge of the inlet, with the shock wave 36'. This alignment maintains a physically attached shock wave on the diverging edges of the inlet and therefore effectively over the entire inlet as well as maintaining a 2-Dimensional flowfield inside the inlet aperture for enhanced performance at the off-design Mach number. The slats 40 are rotatable about a range of angles between the fully retracted position as shown in FIG. 6A and the fully extended position as shown in FIG. 6B which allows matched alignment of the extended slat leading edges 42 with a range of shock angles for a range of speed off the design Mach number.

Figure 7A:
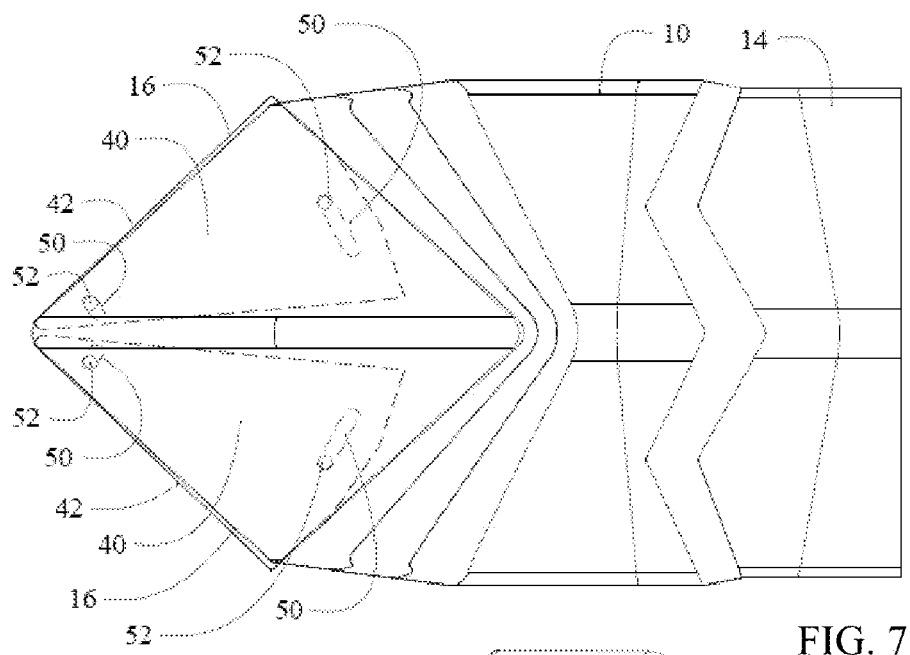
FIGS. 7A and 7B are top and pictorial view of the exemplary aircraft implementation of the caret inlet as integrated into the inlet ramp structure with the slats in the retracted position.
Figure 7B:
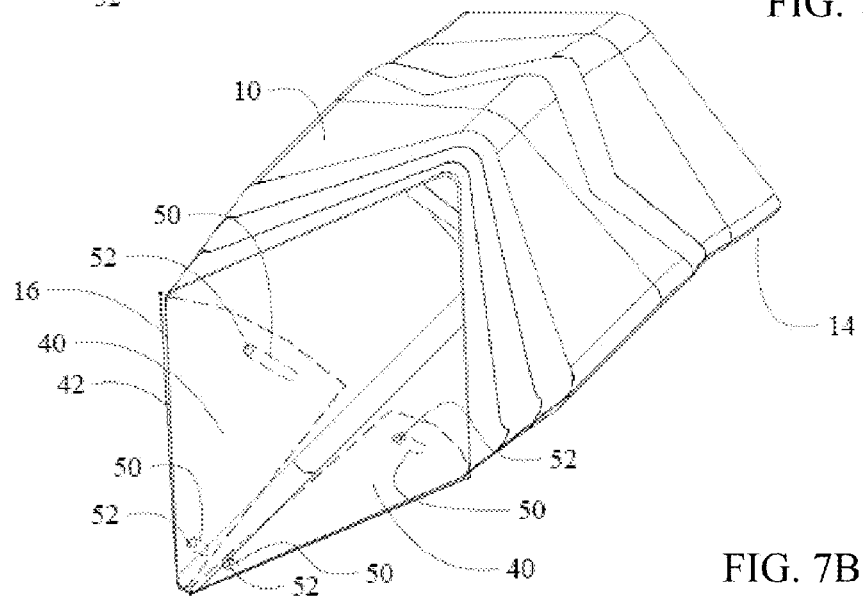

Implementation of the extendible leading edges for a caret inlet using slats is shown in FIGS. 7A-7B (shown inverted for clarity). Slats 40 are carried by the ramp 48 of the aperture of caret inlet 10 and may be structurally supported on an inner or outer surface or within the ramp structure as shown for the example embodiment. The slats 40 may be provided with one or more arcuate slots 50 which receive guide pins 52 to maintain the angular alignment of the slats upon rotation about vertex 44. Two arcuate slots are shown for the embodiment in the drawings which jointly define the rotating extension of the slat. A single arcuate slot in combination with a pivot hinge substantially at the vertex 44 may alternatively be employed. Actuation of the slats may be accomplished by hydraulic or electromechanical actuators for the embodiment shown.

Figure 8A:
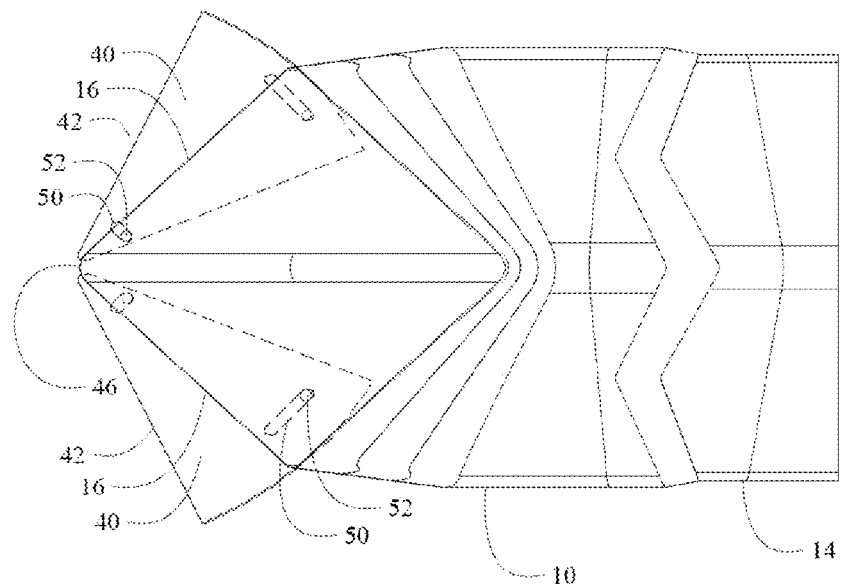
FIGS. 8A and 8B are top and pictorial view of the exemplary aircraft implementation of the caret inlet as integrated into the inlet ramp structure with the slats in the extended position.
Figure 8B:
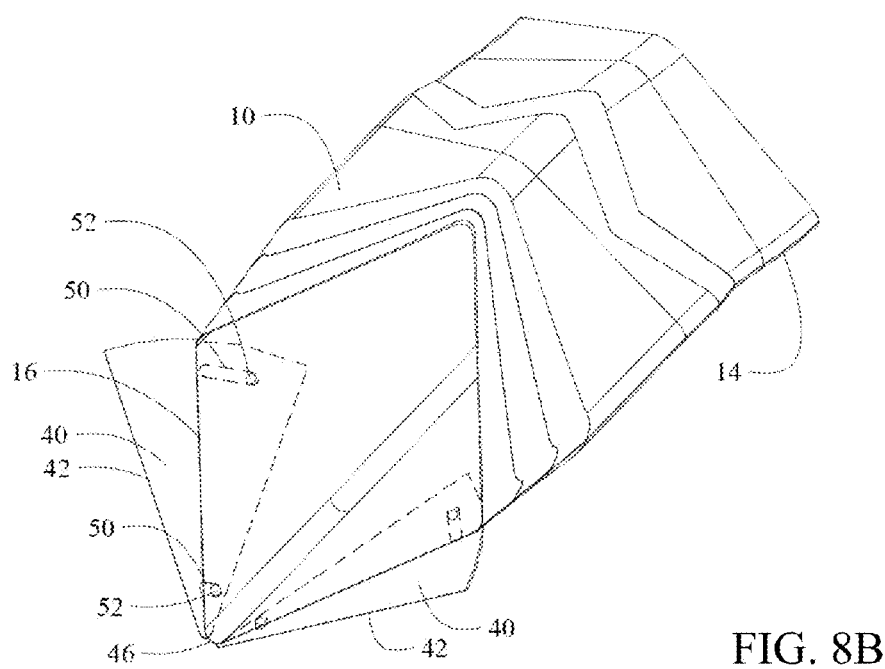

As seen in FIGS. 8A and 8B (shown inverted for clarity), extension of the slats 40 by rotating about the vertex 44, with motion controlled by the arcuate slots 50 and guide pins 52, extends the slat leading edge 42 angularly outward from the ramp leading edge 16. This positioning of the effective leading edge of the inlet by aligning the slat leading edge 42 with the off-design Mach oblique shock wave as described with respect to FIGS. 6B and 6C provides the desired attached shock wave for enhanced performance.

Figure 9A:
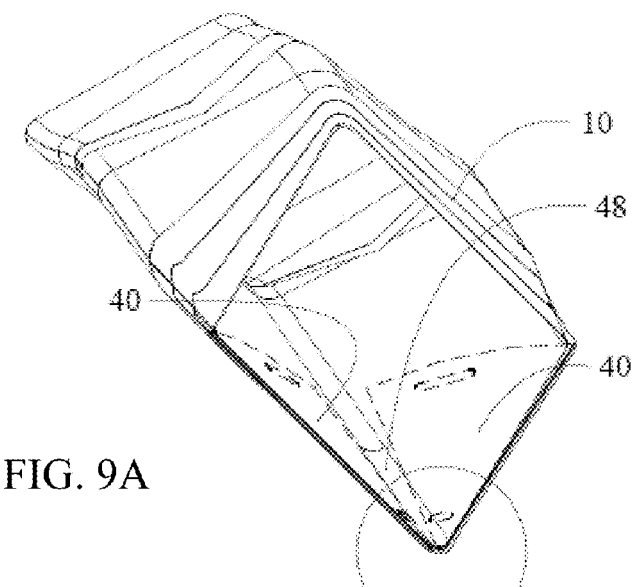
FIGS. 9A and 9B are a pictorial view of the inlet and detailed view of the inlet ramp showing the integration of the slats in the ramp for an exemplary embodiment.
Figure 9B:
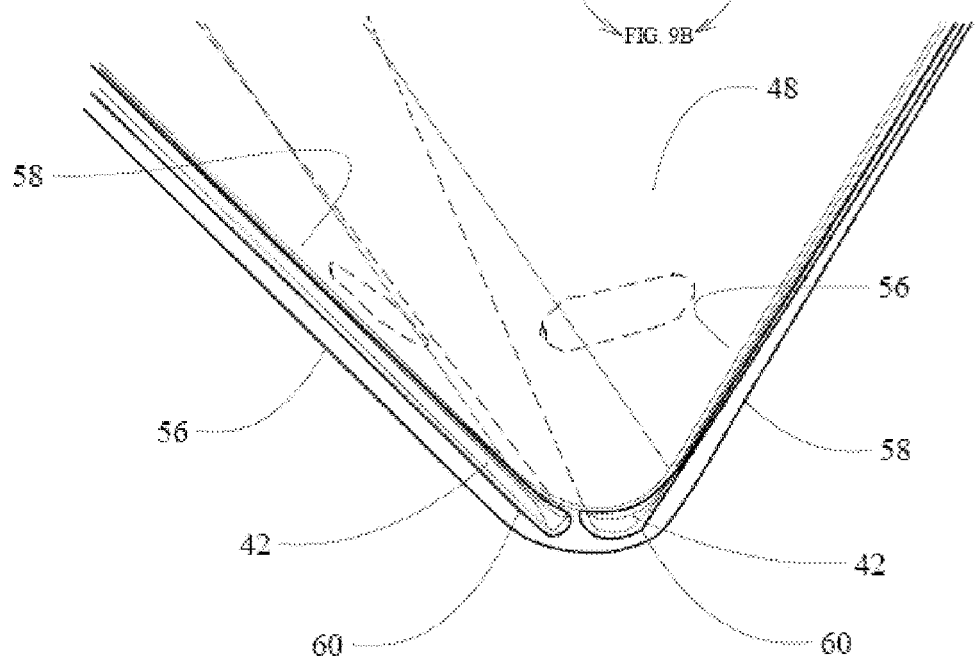

The slats 40 may be integrated into the structure of the ramp 54 in the inlet 10 as seen in FIGS. 9A and 9B (shown inverted for clarity). The ramp 48, for the embodiment shown, has in interior wall 56 of the inlet duct 26 and an exterior wall 58 on the caret inlet 10 as a whole. The slats 40 are mounted between the interior wall 56 and exterior wall 58 and extend through a slot 60 in the inlet leading edge 16. In alternative embodiments, the slats may be mounted to the interior wall 56 with appropriate treatment of the slat leading edge 42 and/or ramp leading edge 16 for aerodynamic requirements.

Figure 10:
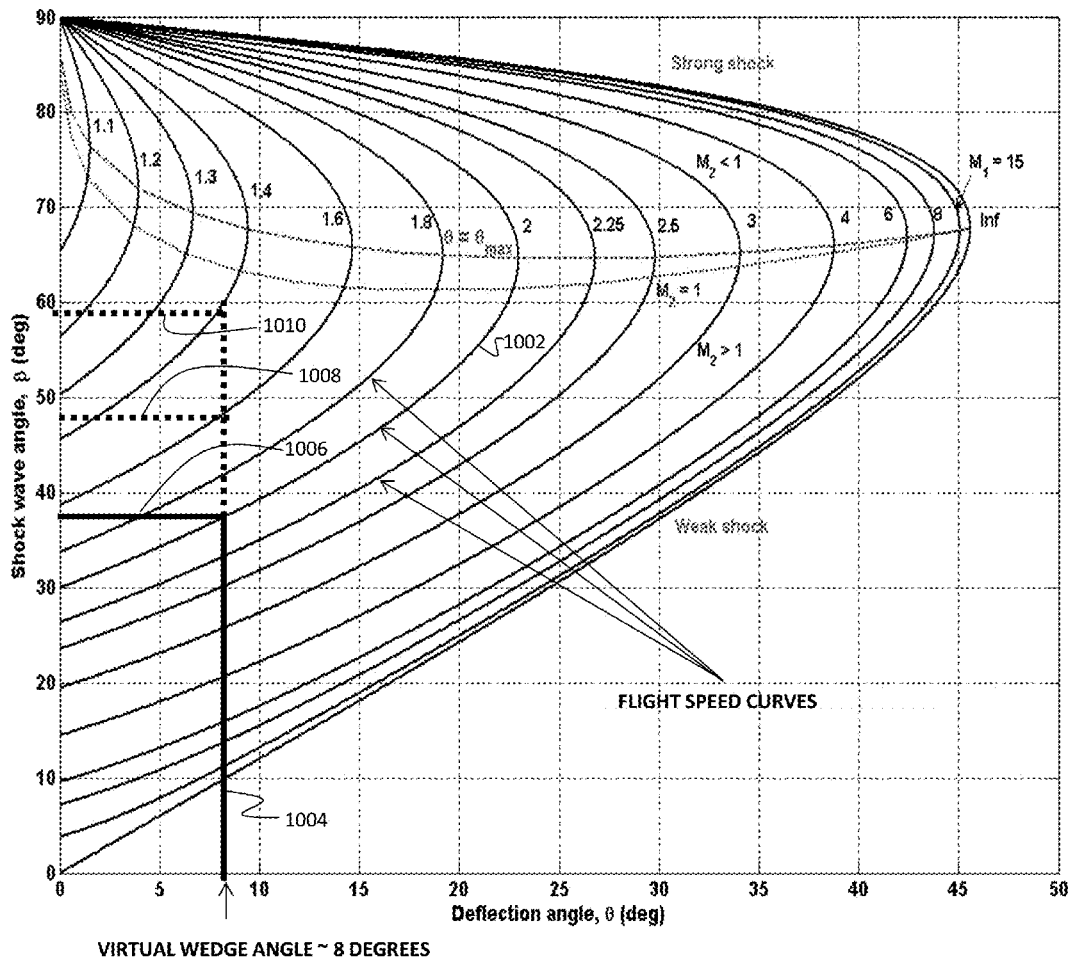
FIG. 10 is a graphical representation of shock wave angle, $\beta$, as a function of virtual wedge angle, $\theta$, for a range of Mach numbers; and, FIG. 11 is a flow chart for a method to operate extendible slats for matched off-design performance in a caret inlet.

As previously noted, the slats 40 may be rotated over a range of motion to provide alignment of the slat leading edge 42 as the effective leading edge of the inlet with a range of off-design Mach oblique shocks thereby maintaining the efficiency of the inlet over a range of speeds below the design Mach number. FIG. 10 demonstrates the shock wave angle, $\beta$, as a function of virtual wedge angle, $\theta$, for a range of Mach numbers. To establish the desired slat extension angle for a given virtual wedge angle, the off-design Mach number is employed to determine the off-design shock wave angle. The slats are then extended to that angle to match off-design shock wave angle. Using FIG. 10, a maximum inlet Mach number or design point is specified; for the example Mach 2 as identified by trace 1002. A virtual wedge angle is then defined for the inlet; for the example, an 8 degree wedge is established creating line 1004. It can be seen from FIG. 10 that at the on design Mach number the shock wave angle is ~37 degrees, line 1006. At off design Mach number, for example Mach 1.4, the shock wave created by the caret inlet is at ~59 degrees, line 1008, or at Mach 1.6, the shock wave is at ~48 degrees, line 1010. The positioning of the slats is then scheduled such that, at off design flight Mach numbers, the leading edge of the slat is on the shock wave plane. The embodiments disclosed are not limited to a fixed-angle virtual wedge. Slats may be employed on a variable-geometry virtual wedge design.

Figure 11:
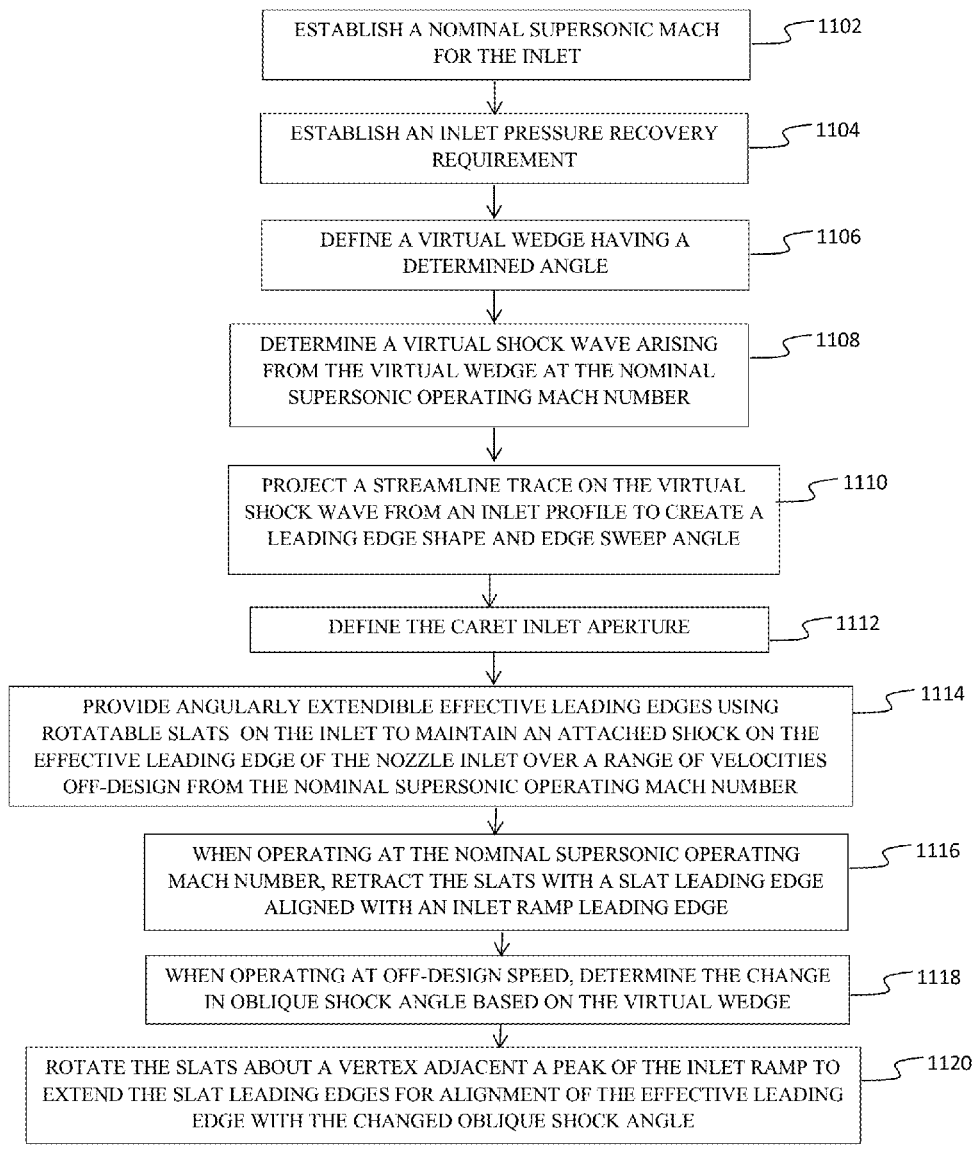

A method of increasing inlet pressure recovery and reducing inlet distortion by maintaining an attached shock wave for a caret inlet across a range of velocities provided by the embodiments disclosed is shown in FIG. 11. An external compression caret inlet is provided with a ramp angle. To provide the external compression caret inlet a nominal supersonic Mach number is established for the inlet, step 1102, and an inlet pressure recovery requirement is established, step 1104, to define a virtual wedge having a determined angle, step 1106. A virtual shock wave arising from the virtual wedge at the nominal supersonic operating Mach number is determined, step 1108 and a streamline trace is projected on the virtual shock wave from an inlet profile (aperture shape) to create a leading edge shape and edge sweep angle, step 1110, and the caret inlet aperture is defined, step 1112. To maintain an attached shock on the effective leading edge of the nozzle inlet over a range of velocities off-design from the nominal supersonic operating Mach number, angularly extendible effective leading edges using rotatable slats are provided on the inlet, step 1114. When operating at the nominal supersonic operating Mach number, the slats are retracted with a slat leading edge aligned with an inlet ramp leading edge, step 1116. When operating at off-design speed, a determination is made of the change in oblique shock angle based on the virtual wedge, step 1118, and the slats are rotated about a vertex adjacent a peak of the inlet ramp to extend the slat leading edges for alignment of the effective leading edge with the changed oblique shock angle, step 1120.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An engine inlet for operation at an off-design Mach number comprising:
   the engine inlet having first leading edges formed by a ramp, the first leading edges forming a rhombus shaped opening;
   effective leading edges formed by a plurality of slats on the engine inlet, the effective leading edges rotatably extendible from a retracted position aligned with a nominal Mach number shock wave to a first extended position aligned with a first off-design Mach number shock wave;
   wherein in the retracted position the effective leading edges formed by the plurality of slats align with the first leading edges formed by the ramp; and
   wherein in the first extended position the effective leading edges formed by the plurality of slats angularly extend from the first leading edges formed by the ramp and align with the first off-design Mach number shock wave.

2. The engine inlet as defined in claim 1 wherein the first extended position comprises a plurality of second extended positions for alignment with a first range of angles corresponding to a second range of a plurality of second off-design Mach number shock waves.

3. The engine inlet as defined in claim 1 wherein the plurality of slats are rotatable about a common leading vertex substantially at an intersection of the first leading edges formed by the ramp for angular extension.

4. The engine inlet as defined in claim 1 wherein the plurality of slats are integrated into the ramp between an inner duct wall and an outer inlet wall.

5. The engine inlet as defined in claim 4 wherein the effective leading edges formed by the plurality of slats extend through slots in the first leading edges formed by the ramp.

6. The engine inlet as defined in claim 3 wherein at least one first arcuate slot of a first slat of the plurality of slats is received on a first pin, and at least one second arcuate slot of a second slat of the plurality of slats is received on a second pin, said first and second pins guiding the at least one first and second arcuate slots on the first and second slats of the plurality of slats during rotation of the first and second slats of the plurality of slats, respectively.

7. The engine inlet as defined in claim 3 wherein two first arcuate slots of a first slat of the plurality of slats are received on a first pair of first respective pins, two second arcuate slots of a second slat of the plurality of slats are received on a second pair of second respective pins, said first pair of the first respective pins guiding the two first arcuate slots of the first slat of the plurality of slats and said second pair of the second respective pins guiding the two second arcuate slots of the second slat of the plurality of slats to create rotation of each of the plurality of slats during extension.

8. An aircraft comprising:
   a fuselage;
   an inlet having first leading edges formed by a ramp, the first leading edges forming a rhombus shaped opening and mounted adjacent the fuselage and connected to a diffuser;
   effective leading edges formed by a plurality of slats on the inlet, the effective leading edges rotatably extendible from a retracted position aligned with a nominal Mach number shock wave to a first extended position aligned with a first off-design Mach number shock wave;
   wherein in the retracted position, the effective leading edges formed by the plurality of slats align with the first leading edges formed by the ramp; and
   wherein in the first extended position, the effective leading edges formed by the plurality of slats angularly extend from the first leading edges formed by the ramp and align with the first off-design Mach number shock wave.

9. The aircraft as defined in claim 8 wherein the fir extended position comprises a plurality of second extended positions for alignment with a first range of angles corresponding to a second range of second off-design Mach number shock waves.

10. The aircraft as defined in claim 8 wherein the plurality of slats are rotatable about a common leading vertex adjacent an intersection of the first leading edges formed by the ramp for angular extension.

11. A method increasing inlet pressure recovery and reducing inlet distortion by maintaining an attached shock wave on at least a portion of an inlet across a range of velocities comprising:

providing the inlet having first leading edges formed by a ramp, the first leading edges forming a rhombus shaped opening, the inlet having external compression;

providing effective leading edges formed by a plurality of slats on the inlet;

angularly extending the effective leading edges formed by the plurality of slats from the first leading edges to an extended position, and aligning the effective leading edges formed by the plurality of slats with at least one off-design number; and retracting the effective leading edges formed by the plurality of slats to a retracted position to align with the first leading edges formed by the ramp according to a nominal supersonic Mach number.

12. The method as defined in claim 11 wherein the step of providing the inlet comprises: establishing the nominal supersonic Mach number for the inlet; defining a virtual wedge having a determined angle based on the nominal supersonic Mach number; and, defining a streamline trace from an inlet profile for a projected edge on a virtual shock wave arising from the virtual wedge at the nominal supersonic Mach number as the first leading edges for the inlet.

13. The method as defined in claim 12 further comprising: determining an oblique shock wave angle from the virtual wedge for the at least one off-design Mach number; extending the effective leading edges formed by the plurality of slats for alignment with the oblique shock wave angle for said at least one off-design Mach number.

14. The method as defined in claim 13 wherein the step of angularly extending the effective leading edges formed by the plurality of slats further comprises rotating the plurality of slats about a common vertex.

15. The method as defined in claim 14 wherein the common vertex is adjacent an intersection of the first leading edges formed by the ramp.

\* \* \* \* \*